(12) United States Patent
Mattson et al.

(10) Patent No.: US 10,176,291 B2
(45) Date of Patent: Jan. 8, 2019

(54) ORDERING OPTIONAL CONSTRAINTS IN A VARIATIONAL SYSTEM

(75) Inventors: Howard Charles Duncan Mattson, Cambridge (GB); Douglas Joseph King, Peterborough (GB); Michael John Gibbens, Cambridge (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 789 days.

(21) Appl. No.: 13/601,132

(22) Filed: Aug. 31, 2012

(65) Prior Publication Data

US 2014/0012546 A1    Jan. 9, 2014

Related U.S. Application Data

(60) Provisional application No. 61/668,794, filed on Jul. 6, 2012.

(51) Int. Cl.
    *G06F 17/50*      (2006.01)
    *G06T 19/20*      (2011.01)

(52) U.S. Cl.
    CPC .......... *G06F 17/5086* (2013.01); *G06F 17/50* (2013.01); *G06T 19/20* (2013.01); *G06F 2217/06* (2013.01); *G06T 2219/2021* (2013.01)

(58) Field of Classification Search
None
See application file for complete search history.

(56) References Cited

U.S. PATENT DOCUMENTS

| 5,251,290 A | 10/1993 | Pabon | |
|---|---|---|---|
| 2002/0123812 A1* | 9/2002 | Jayaram et al. | 700/98 |
| 2005/0128211 A1* | 6/2005 | Berger et al. | 345/582 |
| 2006/0082571 A1* | 4/2006 | McDaniel | 345/419 |
| 2013/0124149 A1* | 5/2013 | Carr et al. | 703/1 |

FOREIGN PATENT DOCUMENTS

| CN | 102067130 A | 5/2011 |
|---|---|---|
| CN | 102073499 A | 5/2011 |
| JP | H4-311272 A | 11/1992 |

(Continued)

OTHER PUBLICATIONS

International Search Report dated Sep. 5, 2013 in connection with International Patent Application No. PCT/US2013/049002, 4 pages.

(Continued)

*Primary Examiner* — Omar F Fernandez Rivas
*Assistant Examiner* — Bijan Mapar

(57) ABSTRACT

Methods for product data management and corresponding systems and computer-readable mediums. A method includes receiving a CAD model in the data processing system, the CAD model a plurality of features and constraints, including optional constraints. The method includes receiving a user operation to manipulate a seed feature, and identifying a plurality of optional constraints corresponding to the user operation. The method includes sorting the optional constraints and applying a sorted optional constraint. The method includes performing the user operation according to the applied constraints to produce a modified CAD model and storing the modified CAD model.

18 Claims, 9 Drawing Sheets

(56) References Cited

FOREIGN PATENT DOCUMENTS

| JP | 07-152817 A | 6/1995 |
|----|-------------|--------|
| JP | 2003-122800 A | 4/2003 |
| JP | 2005-202568 A | 7/2005 |
| JP | 2011-516999 A | 5/2011 |

OTHER PUBLICATIONS

Written Opinion of International Searching Authority dated Sep. 5, 2013 in connection with International Patent Application No. PCT/US2013/049002, 9 pages.
Sohrt, et al; "Interaction with Constraints in 3D Modeling"; Computer Science Department University of Utah; Nov. 1990; 18 pages.
Gleicher, Michael L.; "A Differential Approach to Graphical Interaction"; Carnegie Mellon; Nov. 18, 1994; 250 pages.
Hoffmann, et al.; "A Constraint-Based Manipulator Toolset for Editing 3D Objects"; Proceeding of the Fourth Symposium on Solid Modeling and Applications; Atlanta Georgia; May 14-16, 1997; 14 pages.
Chinese Office Action dated Feb. 3, 2017, for CN Application No. 201380036119.8, 9 pages.
Japanese Decision to Grant dated Aug. 7, 2017, for JP Application No. 2015-520637, 2 pages.
Communication from a foreign patent office in a counterpart foreign application, ISA/EPO, International Search Report and Written Opinion of the International Searching Authority for Application No. PCT/US2013/049003, dated Sep. 3, 2013, 13 pages.
Borning, Alan, et al., "Constraint Hierarchies," Proceedings of the Object-Oriented Programming Systems Languages and Applications Conference (OOPSLA), Orlando, Florida, Oct. 4-8, 1987, 14 pages. XP000300371.
Eggli, Lynn, et al., "Inferring 3D models from freehand sketches and constraints," Computer-Aided Design, Elsevier Publishers BC, Barking, GB, vol. 29, No. 2, Feb. 1, 1997, 12 pages. XP004070873.
Hsu, C., et al., "A Constraint-based Manipulator Toolset for Editing 3D Objects," Proceedings of the Fourth Symposium on Solid Modeling and Applications, Atlanta, Georgia, May 14-16, 1997, 14 pages. XP000724303.

\* cited by examiner

ORDERING OPTIONAL CONSTRAINTS IN A VARIATIONAL SYSTEM

CROSS-REFERENCE TO OTHER APPLICATIONS

This application claims the benefit of the filing data of U.S. Provisional Patent Application 61/668,794, filed Jul. 6, 2012, which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or "PDM" systems).

BACKGROUND OF THE DISCLOSURE

PDM systems manage PLM and other data. Improved systems are desirable.

SUMMARY OF THE DISCLOSURE

Various disclosed embodiments include methods for product data management, corresponding systems, and computer-readable mediums. A method includes receiving a CAD model in the data processing system, the CAD model a plurality of features and constraints, including optional constraints. The method includes receiving a user operation to manipulate a seed feature, and identifying a plurality of optional constraints corresponding to the user operation. The method includes sorting the optional constraints and applying a sorted optional constraint. The method includes performing the user operation according to the applied constraints to produce a modified CAD model and storing the modified CAD model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 6C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Within a variational modeling system, such as the "Synchronous Technology" processes used in Siemens Product Lifecycle Management Software, Inc. products, changes are generally expressed variationally. A variational system describes the parameters of and relationships between features in an object model in terms of geometric constraints and dimensions. Such systems then use a "solver" process to process these constraints and dimensions, along with a multitude of ancillary constraints and dimensions required to maintain design intent, and the entire model is solved simultaneously.

In such a variational modeling system, achieving "natural" behavior is a key goal. In realistic complex models an edit can expect to encounter a combination of aspects, each of which has a corresponding "natural" behavior. It is only when a system can consistently define overall behavior in such combination cases, often requiring conflict resolution, that it can be truly useful.

Disclosed embodiments include a definition of combined behavior and systems and methods for achieving it.

Figure 1:
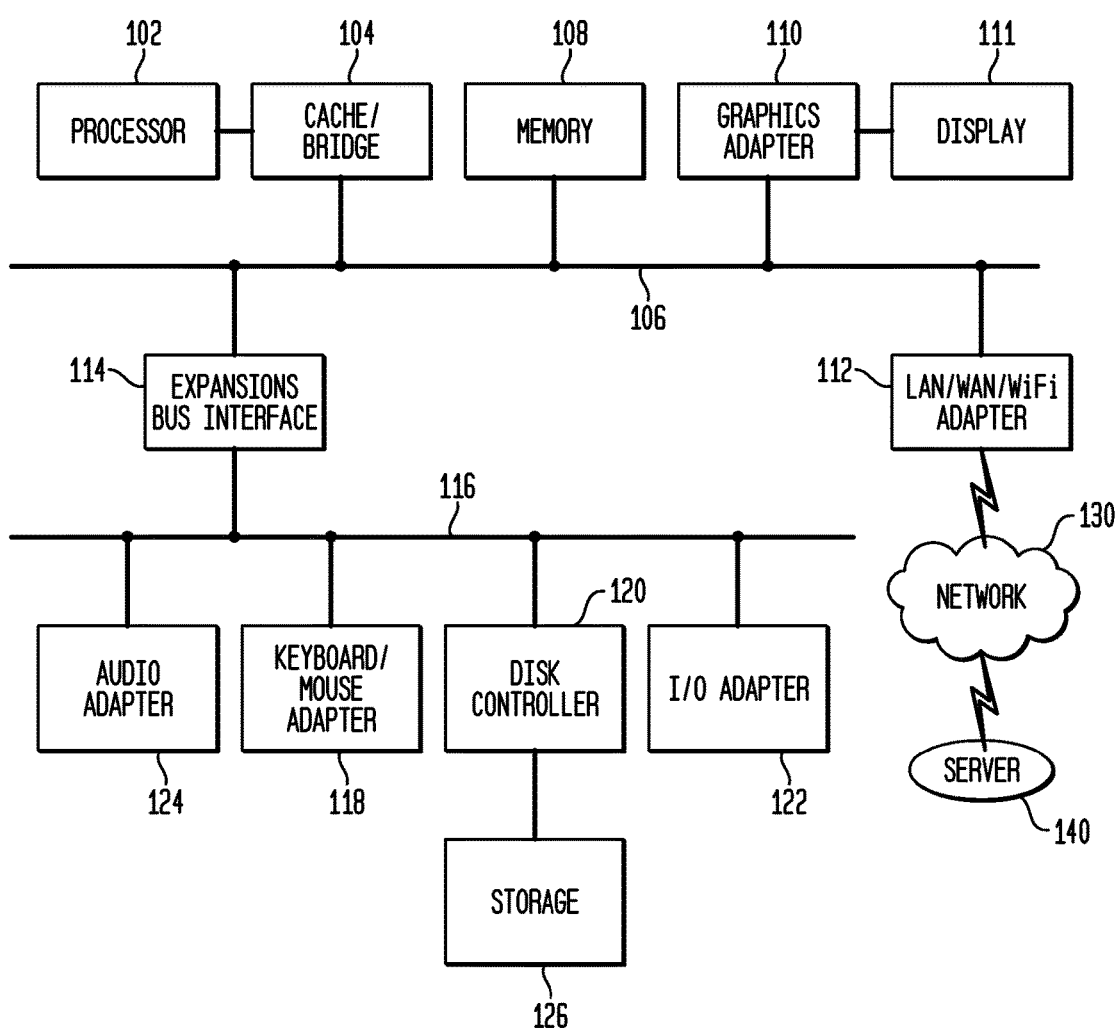
FIG. 1 depicts a block diagram of a data processing system in which an embodiment can be implemented.

FIG. 1 depicts a block diagram of a data processing system in which an embodiment can be implemented, for example, as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106.

Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Optional constraints are those that are applied to the model only if they do not prevent a given edit from occurring. They are different from regular constraints which may prevent a model from being edited.

Figure 2A:
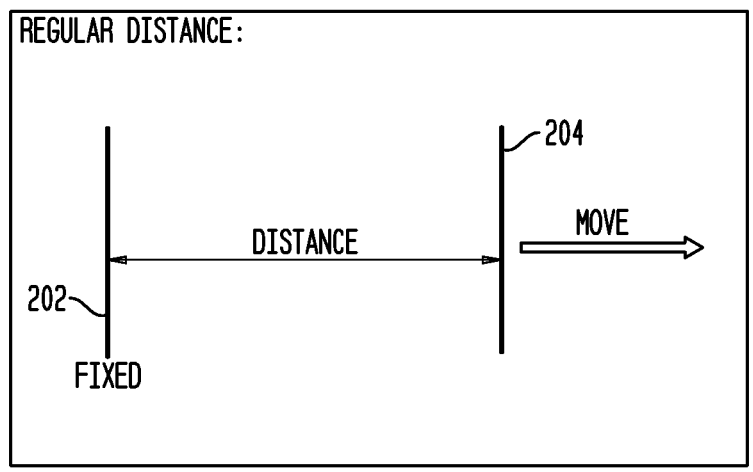
FIGS. 2A and 2B illustrate required and optional constraints, in accordance with disclosed embodiments.
Figure 2B:
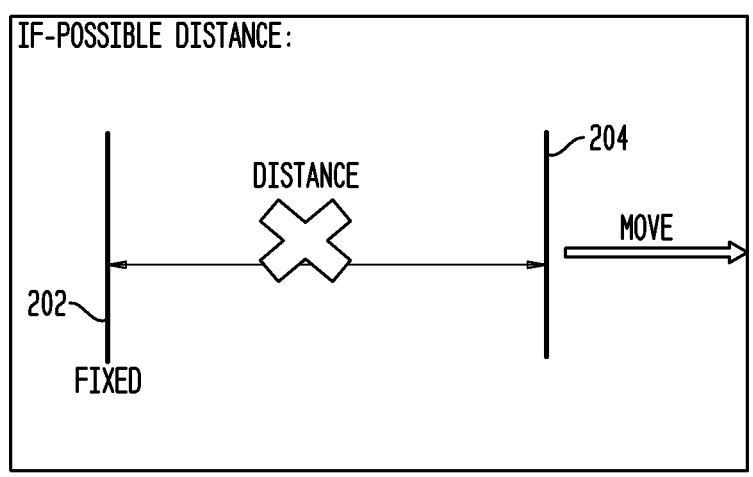

FIGS. 2A and 2B illustrate required and optional constraints, in accordance with disclosed embodiments. FIG. 2A shows a simple model of two lines 202 and 204 that are constrained to be a specified distance apart. In this case, line 202 is also constrained to be fixed in location.

If the system or user attempts to move line 204 to the right, as illustrated, the move edit would fail in a conventional constraint system. This is due to the rigid distance constraint between the line 204 being moved and line 202.

However, if the distance constraint is converted to an optional constraint, a "distance-if-possible," the edit can now succeed, but with the distance being broken. FIG. 2B illustrates the result, with the move successful but the optional distance constraint now unsatisfied. The same principals apply to simple or complex two-dimensional (2D) or three-dimensional (3D) models.

Optional constraints are useful in controlling the general behavior of model edits. Behavior could be controlled by adding regular constraints to the system, but very often these additional constraints would conflict with the other constraints on the model, placed either by the system or by the user, or would conflict directly with the edit being attempted. Using optional constraints to control behavior means there are no conflicts.

There are many examples where describing general behavior in terms of optional constraints is useful, such as avoiding cylinders changing their radius and avoiding planes from rotating.

When using optional constraints to control behavior, most model edits will result in multiple optional constraints being generated. Within these optional constraints it is possible that some will conflict, giving a choice over which is applied, i.e., it is possible to apply optional constraint A or B, but not both A and B.

If a system is trying to automatically give intuitive behavior to the user, then any optional constraints in the system must be ordered by some methodology so that the most important optional constraints are applied in preference to less important optional constraints.

Disclosed embodiments include systems and methods that apply optional constraints in a manner that produces a more interactive interaction and intuitive response to a user.

Disclosed embodiments apply a set of ordering requirements to order a given set of optional constraints The order should be unique for a given edit on a given model;

The order should take into account a number of general behavioral preferences, such as "preventing geometries from rotating" being more important than "preventing geometries from changing size";

The order should be dependent on the edit that is being requested by the user, meaning that the order will change for different edits on the same model;

The order should be dependent on the model presented to the system, meaning that adding additional constraints to a system should change the order of any optional constraints;

The order of lower priority constraints should be able to change as higher priority constraints are imposed; and Any process should be easily expandable to handle special cases.

To meet these requirements, disclosed embodiments use a sorting process that orders a given set of optional constraints on a given model for a given edit based on the following properties, each described in more detail below:

By behavior class;
By information known about the feature being constrained;
By distance from the edit; and
By static model properties.

Specific embodiments can order constraints in the general order listed above, but this ordering is not strictly necessary in all embodiments. For example, particular elements of the behavior class, known information, and distance may be mixed to give more intuitive behavior.

Behavior class: "Behavior class" is defined to be the reason a particular optional constraint (or constraints) was created. There are many reasons why an optional constraint may be created, but these generally fall into two broad categories. First, those based on information the user has given, such as dimensions that have been placed on the model. Second, those based on certain geometric configurations of elements in the model, in its un-edited state.

One example of a behavior class is dimension-end data, where the faces on which a dimension acts are given certain behavior. Another example of a behavior class is ortho-locking, where geometries are measured to be aligned to the principle axes of the part and requested to keep this alignment. Another example of a behavior class is size locking, where geometries are defined to have certain size properties and are requested to keep this size. Another example of a behavior class is pattern spacing, where a pattern is defined to have certain spacing properties which are requested to be kept. Another example of a behavior class is tipping, where geometries are adjacent to each other and must rotate to stay adjacent as the model is changed. Of course, these examples are not intended to be exhaustive or limiting.

The system can prioritize a given set of behavior classes with respect to each other to give a general optional constraint order. This prioritization could be static, automatically adjusted for certain types of part, or controlled by the user via options if necessary.

Information known about the feature: Some optional constraints may be added to the system to ensure some general behavior of a particular feature. For example, for a feature with a local coordinate system defining local-X and local-Z directions, the system or user can define desirable behavior properties.

One example of a desirable behavior property based on known information is that it is preferable for a feature to move rather than rotate, implying a local order of any optional constraints added to the system, e.g., local-X constraints before local-Z constraints.

Another example of a desirable behavior property based on known information is that, if a feature has to move, then don't constrain it to move in a particular direction. This implies that any secondary optional constraints should not be applied if the first cannot be applied.

To enable local ordering, clusters of optional constraints are defined by the feature, where the order of the constraints within the cluster is used to define the order and adjacency of the constraints in the main sorted list.

Distance from the edit: To describe "distance from the edit", the following terms are used herein. "Operation" refers to the edit the user is making on the model. "Seeds" or "seed features" refers to the geometries the user is acting directly on to make the edit. "Objects" refers to the features of the model that cause constraints to be generated and solved and as a result link geometries together.

"Distance from the edit" refers to the shortest distance between a geometry with an optional constraint applied to it and the "seeds" of the operation, when measured with respect to objects in the model.

The distance is computed by building a graph representing the geometries involved in the edit (the nodes), linked together by objects (the edges). The shortest distance between any two geometries (or nodes) can then be measured by following a series of edges through the graph using standard graph analysis techniques.

Examples of the objects represented in the graph are dimensions, such as distance or angle; constraints, such as concentric or parallel; and features, such as holes or patterns.

The distance measured must take into account any geometries (or nodes) that are fixed. To give intuitive behavior, the shortest distance should not pass through geometries that are known to be fixed.

In addition, as optional constraints are added to the model, a geometry that was previously able to move may now become fixed. Therefore, the system re-evaluates the freedoms of all geometries in the model and updates distances within the graph accordingly before sorting any remaining optional constraints.

Static model properties: To arrive at a final definite ordering for all optional constraints, the system can use some static model properties. These properties are used to ensure the ordering is definite and therefore repeatable, rather than only to affect behavior. Examples of static properties of the model that can be used include the position of geometries, for example geometries could be ordered by their X, Y, and Z position in 3D space, and identifiers associated with geometries can then be used to identify them in the system.

Figure 3:
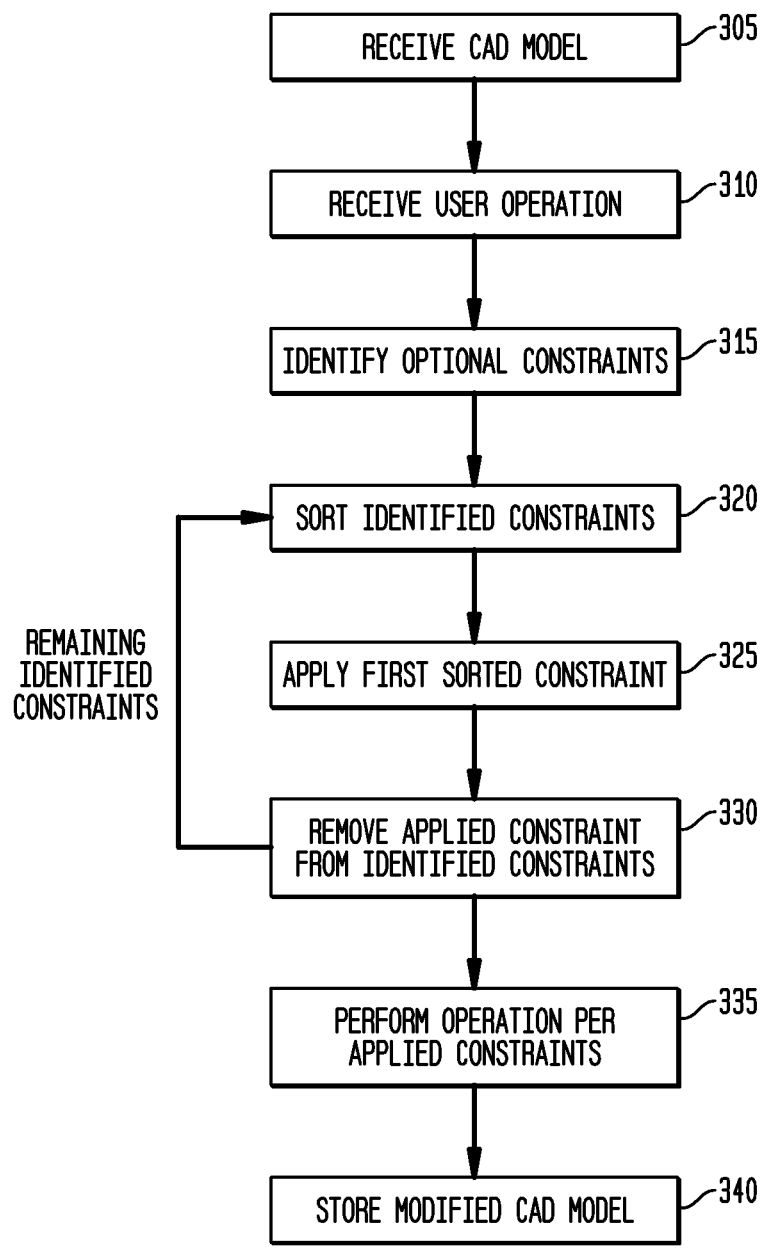
FIG. 3 depicts a flowchart of a process in accordance with disclosed embodiments.

FIG. 3 depicts a process in accordance with disclosed embodiments, that can be performed, for example, by one or more PDM data processing systems such as data processing system 100, referred to generically below as the "system".

The system receives a CAD model (step 305). This can be a 2D or 3D model, and the model includes a plurality of features and constraints, including optional constraints.

The system receives a user operation (step 310). The user operation is an edit the user is making to the model by manipulating at least one seed feature.

The system identifies a plurality of optional constraints corresponding to the user operation (step 315)

The system sorts the optional constraints (step 320). The sorting can be according to any or all of the properties described above, including by behavior class, by information known about each feature being constrained, by distance from the edit (seed feature), or by static model properties.

The system can also define a dependency between optional constraints where secondary constraints will only be applied if the first constraint is applied. In other cases, this dependency can be based on any criteria or special case in the model. This dependency can be considered as part of the sorting process.

The system applies the first sorted optional constraint (step 325).

The system removes the applied optional constraint from the identified optional constraints (step 330).

The system repeats steps 320, 325, and 330 until there are no remaining identified constraints that have not been applied. The process of applying the first sorted constraint, then resorting the remaining constraints before they are applied allows the application of constraints higher in the list to affect the order of constraints lower in the list. This provides a distinct technical advantage in enabling the edit process to adapt to changes in the freedoms of geometries.

A general ability to drop optional constraints based on certain criteria or dependencies is facilitated by the above general process whereby all subsequent constraints are re-sorted as more important ones are applied.

The system performs the operation according to the applied constraints (step 335) to produce a modified CAD model.

The system stores the modified CAD model (step 340), and can also display the modified CAD model.

Of course, those of skill in the art will recognize that, unless specifically indicated or required by the sequence of operations, certain steps in the processes described above may be omitted, performed concurrently or sequentially, or performed in a different order. Any of the other features and processes described above can be included in the process of FIG. 3.

FIGS. 4A-4F illustrate an example of general optional constraint ordering in accordance with disclosed embodiments.

Figure 4A:
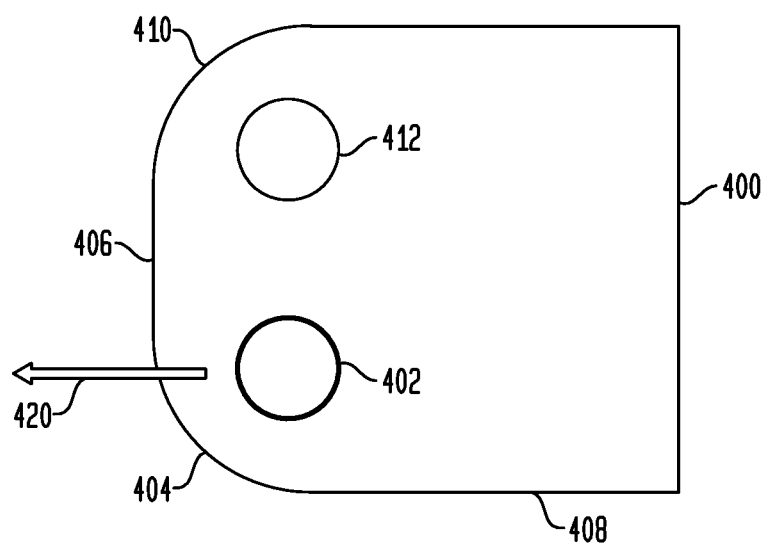
FIGS. 4A-4F illustrate an example of general optional constraint ordering in accordance with disclosed embodiments.

FIG. 4A shows a simple 2D model 400. In this example, the circle 402 is being moved to the left, as indicated by arrow 420. It is concentric with the outer arc 404, which is tangent to the adjacent vertical line 406 and horizontal line 408. The vertical line is tangent to the top arc 410, and the top arc is concentric to the top circle 412.

Figure 4B:
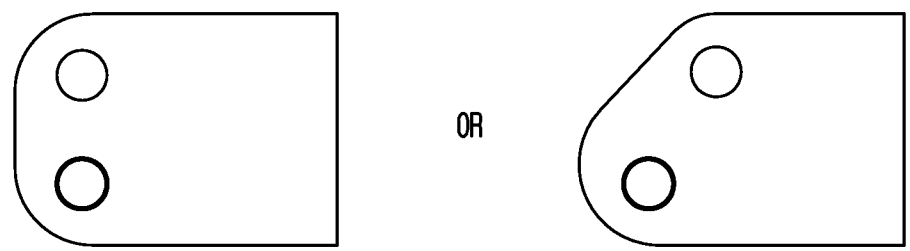

FIG. 4B illustrates two possible results of moving circle 402 while maintaining these constraints. Both are reasonable, but the left result is probably more desirable because it preserves the vertical alignment of the vertical line.

Figure 4C:
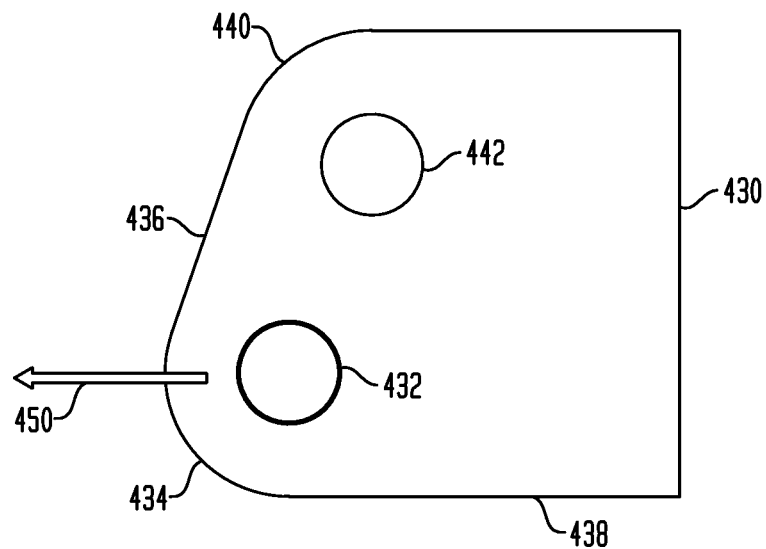

FIG. 4C illustrates a similar 2D model 430. In this example, the circle 432 is being moved to the left, as indicated by arrow 450. It is concentric with the outer arc 434, which is tangent to the adjacent angled line 436 and horizontal line 438. The angled line is tangent to the top arc 440, and the top arc is concentric to the top circle 442.

Figure 4D:
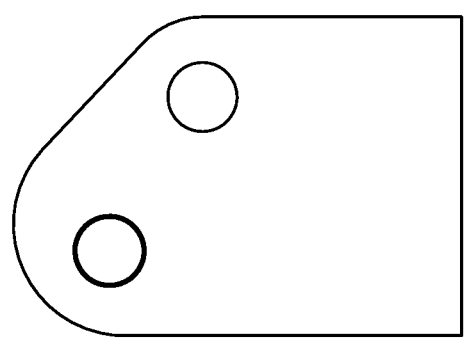

In this case, the result shown in FIG. 4D is more reasonable because more rotation is being applied to an already rotated line.

The decision process for achieving this behavior can be generalized by placing a set of optional constraints and then ordering them correctly.

Figure 4E:
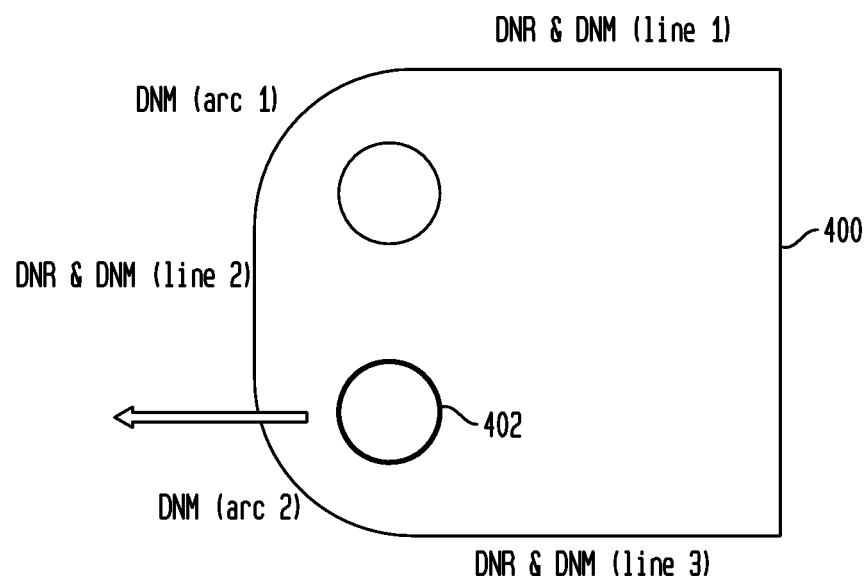

FIG. 4E illustrates the model 400 of FIG. 4A with optional constraints. In this case, the labeled constraints are:

DNR=Do Not Rotate (if possible), created for "ortho-locking".

DNM=Do Not Move (if possible), created for "tipping".

Figure 4F:
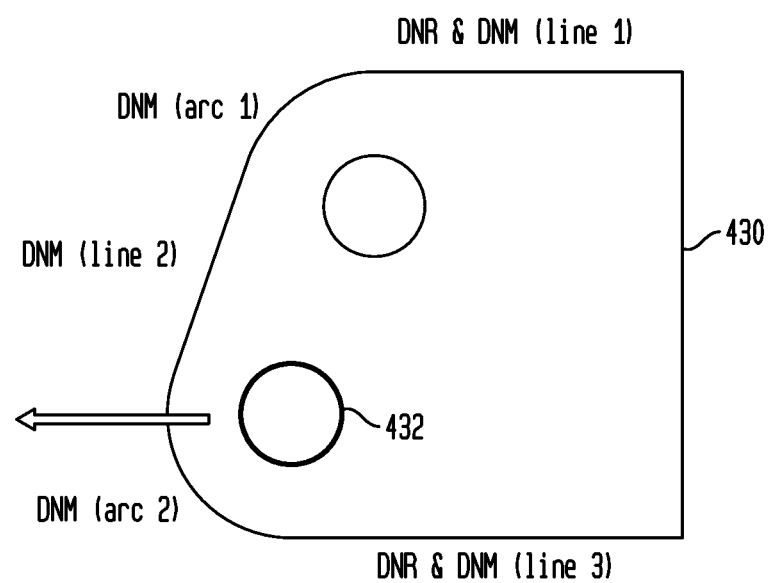

FIG. 4F illustrates the model 430 of FIG. 4C with optional constraints. Note the decision to not place a DNR on line 2 is based on its original orientation:

The system or user can order the optional constraints by the following logic to get the correct behavior:

Order first by reason the optional constraint was created, ortho-locking or tipping in the above examples, with ortho-locking considered more important than tipping.

Order second by constraint distance from the target of the operation (circles 402 and 432), furthest away first.

Order third by static model properties, such as IDs.

Drop some optional constraints based on special conditions.

This logic produces the following order for the example of model 400:

| Position | Constraint | Reason | Distance | Status |
| --- | --- | --- | --- | --- |
| 1 | DNR-line 2 | Ortho | 2 | Applied |
| 2 | DNR-line 3 | Ortho | 2 | Applied |
| 3 | DNR-line 1 | Ortho | 3 | Applied |
| 4 | DNM-line 1 | Tipping | 4 | Applied |
| 5 | DNM-arc 2 | Tipping | 3 | Not applied |
| 6 | DNM-line 2 | Tipping | 2 | Dropped |
| 7 | DNM-line 3 | Tipping | 2 | Dropped |
| 8 | DNM-arc 1 | Tipping | 1 | Not applied |

This results in the following processing according to the process described above. The constraints are ordered first by type, then by distance from the edit. "DNR—line 2" and "DNR—line 3" are still equal so are ordered by model property, for example the number of the geometry. "DNM—line 2" and "DNM line 3" are also equal, but a special case for tipping rules that are equal distance is established where both rules are dropped so as not to force undesirable behavior.

This logic produces the following order for the example of model 430:

| Position | Constraint | Reason | Distance | Status |
| --- | --- | --- | --- | --- |
| 1 | DNR-line 3 | Ortho | 2 | Applied |
| 2 | DNR-line 1 | Ortho | 3 | Applied |
| 3 | DNM-line 1 | Tipping | 4 | Applied |
| 4 | DNM-arc 1 | Tipping | 3 | Applied |
| 5 | DNM-line 2 | Tipping | 2 | Dropped |
| 6 | DNM-line 3 | Tipping | 2 | Dropped |
| 7 | DNM-arc 2 | Tipping | 1 | Not applied |

In this case, "DNM—arc 1" is additionally applied, thus forcing the rotation behavior of line 2.

FIGS. 5A-5D illustrate an example of optional constraint ordering including measuring the distance from an edit, in accordance with disclosed embodiments.

Figure 5A:
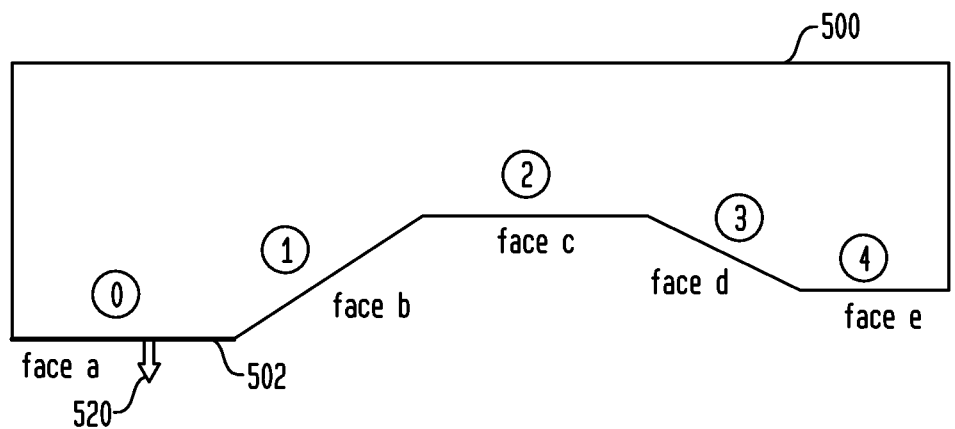
FIGS. 5A-5D illustrate an example of optional constraint ordering including measuring the distance from an edit, in accordance with disclosed embodiments.

FIG. 5A shows a simple 2D model 500 to illustrate an example of distance. The five faces in this example below, faces a to e, are related by model data in such a way that there is one graph step between each adjacent face.

In an example operation, face a 502 is the seed, and is being translated in the direction shown by arrow 520, and its length is constrained to remain unchanged. The distances of faces a to e are shown as the circled numbers in FIG. 5A: 0 for the seed, to 4 for face e, which is the most distant as measured by graph connectivity.

As an example of behavior, the system attempts to apply optional constraints to not move faces a to e. The optional constraints would be ordered furthest away from the edit as follows:

| Position | Constraint | Distance | Status |
| --- | --- | --- | --- |
| 1 | DNM-face e | 4 | Applied |
| 2 | DNM-face d | 3 | Applied |
| 3 | DNM-face c | 2 | Applied |
| 4 | DNM-face b | 1 | Not applied |
| 5 | DNM-face a | 0 | Not applied |

Figure 5B:
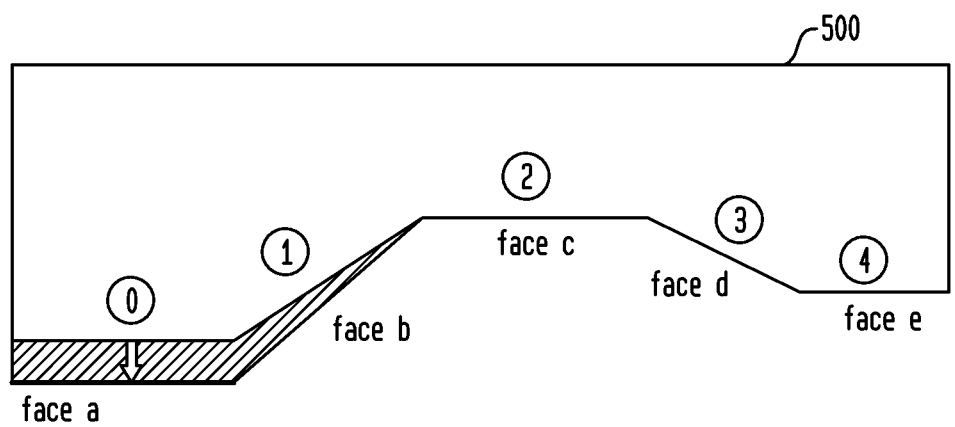

FIG. 5B illustrates the resulting change to model 500 using this order. Note that faces a is moved (the move made by the user), and face b was moved (as it must to remain connected to face a), but faces c-e are not moved.

Figure 5C:
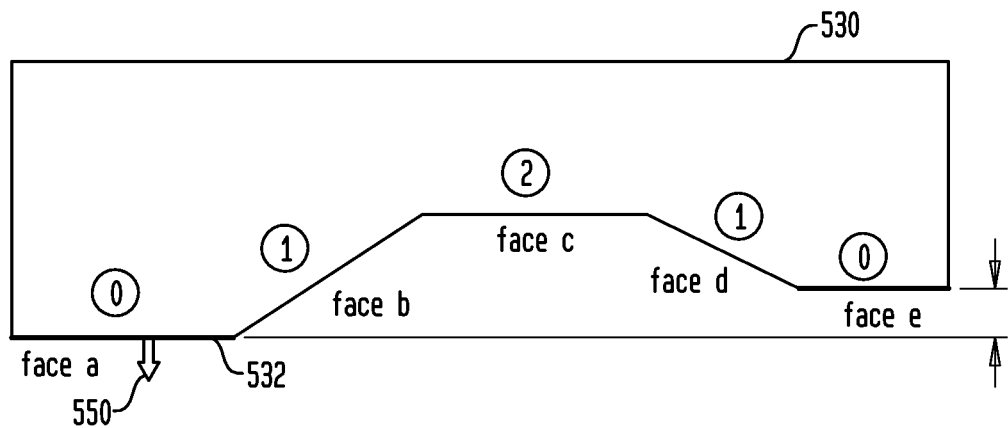

For the same operation, if the model data is changed adding additional non-optional constraints between face a and face e such that the two faces must translate rigidly, and neither may change length, then the graph connectivity will be significantly altered. The inclusion of the constraint between faces a and e in the operation brings face d nearer to the operation being performed. FIG. 5C illustrates a model 530, similar to model 500, but with these additional constraints. The user wishes to move face a 532 in the direction of arrow 550.

The same optional constraints would be generated, however they would now be ordered as follows:

| Position | Constraint | Distance | Status |
|---|---|---|---|
| 1 | DNM-face c | 2 | Applied |
| 2 | DNM-face d | 1 | Not applied |
| 3 | DNM-face b | 1 | Not applied |
| 4 | DNM-face e | 0 | Not applied |
| 5 | DNM-face a | 0 | Not applied |

Figure 5D:
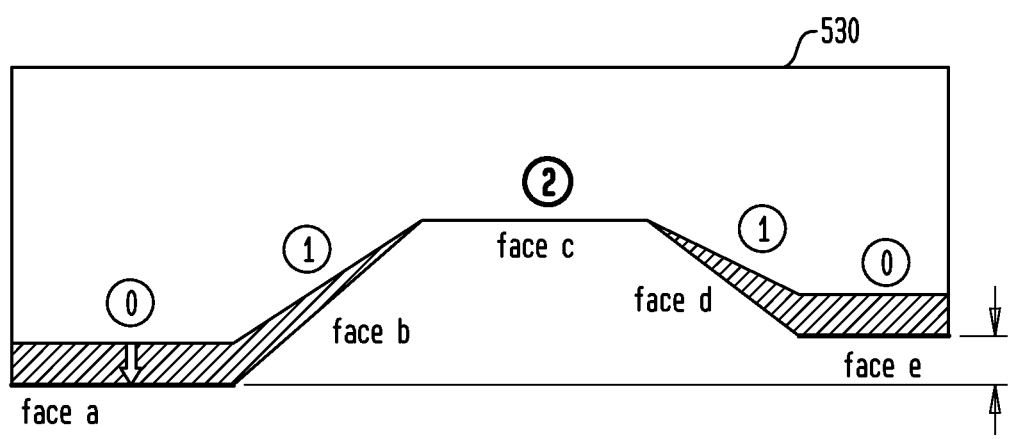

FIG. 5D illustrates the resulting change to model 530 using this order of optional constraints, and maintaining the non-optional constraints.

Figure 6A:
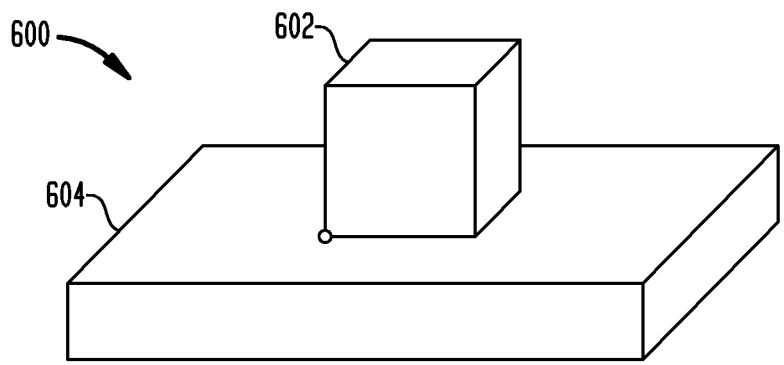
FIGS. 6A-6C illustrate an example of optional constraint ordering including using feature information present in the model, in accordance with disclosed embodiments.
Figure 6B:
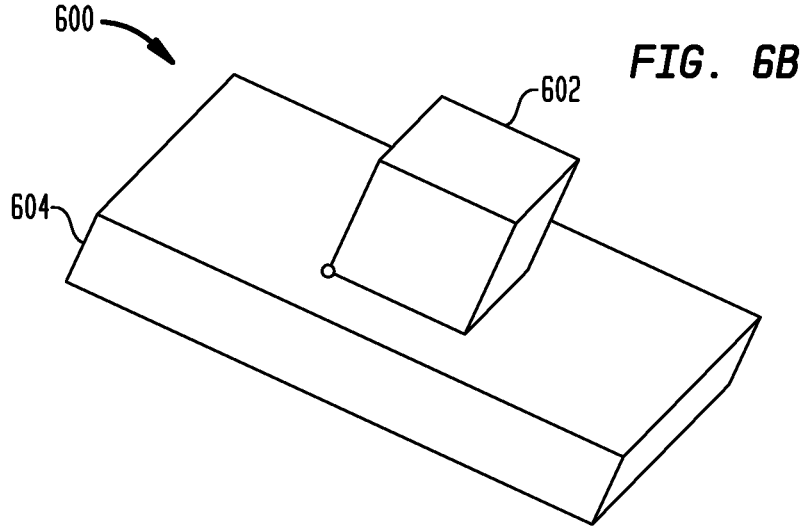
Figure 6C:
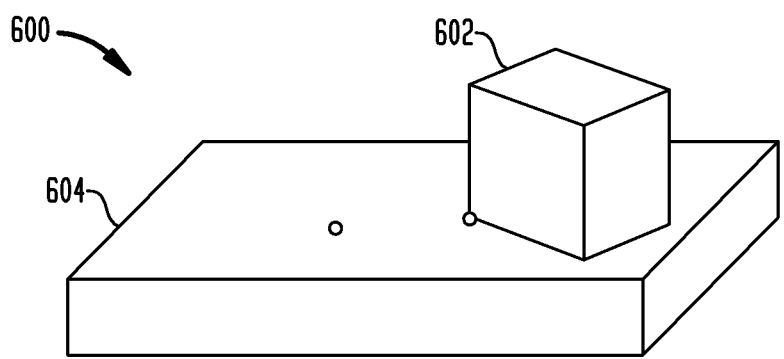

FIGS. 6A-6C illustrate an example of optional constraint ordering including using feature information present in the model, in accordance with disclosed embodiments.

The preferred behavior of dependent features can also be defined using ordered optional constraints.

FIG. 6A shows an example of a 3D model 600 in which a feature A (cube 602) is placed on feature B (cuboid 604).

Under edit, the following behaviors are desirable:
If feature B (cuboid 604) moves, feature A (cube 602) should also move; and
If feature A (cube 602) moves, feature B (cuboid 604) should not move.

This can be achieved by the following local ordering of optional constraints, defined by the dependency between the features:
DNM on feature B (cuboid 604);
DNM on feature A (cube 602); and
Keep-rigid between A (cube 602) and B (cuboid 604) applied only if B is moving.

Using this order when feature B is moved produces:
DNM on feature B (cuboid 604)—Not applied;
DNM on feature A (cube 602)—Not applied; and
Keep-rigid between A (cube 602) and B (cuboid 604) applied only if B is moving—Applied.

FIG. 6B illustrates the result of moving feature B (cuboid 604).

Using this order when feature A is moved produces:
DNM on feature B—Applied;
DNM on feature A—Not applied; and
Keep-rigid between A and B applied only if B is moving—Not Applied FIG. 6C illustrates the result of moving feature A (cuboid 602).

If further dependent features are 'stacked', then this process extends naturally to support the correct behavior.

Disclosed embodiments enable a user to perform accurate and intuitive editing of CAD models taking into account combined behavior. The processes described herein can implement a defined ordering of individual "natural" behaviors, when encountered in combination, based on considerations including behavior type, distance from the point of action, and other specific model and domain properties. Use of optional constraints as described herein can manage the following examples of individual behavior to produce an overarching natural behavior of the system as a whole:

When moving a geometric feature such as a hole, boss, etc., the edit should not drive the geometry it is constructed upon (i.e., its under);

When changing or moving a geometry, any geometric features constructed upon it such as holes, bosses, etc., should move with it in sympathy with the input change applied;

Specifically, in the sheet metal context, moving a "thickness face" should not drive the owning plate to move;

When changing the value of a dimension (distance or angle) which drives a vertex, then the faces incident at that vertex should change minimally, preferably with most remaining fixed and only one moving;

When a cone geometry is present in the model, and particularly when the cone is tangent to another geometry, then the cone should be preferentially prevented from sliding along its axis;

Geometry which is initially aligned to the principle directions of the model should preferentially remain so;

Internal freedoms such as radii, half angle, etc., should preferentially remain unchanged;

The spacing between occurrences of a pattern should preferentially remain unchanged; and The quantity of neighboring faces included in a change should be minimized by allowing faces to "tip" as a way of bounding the changeset.

Various disclosed embodiments include using a process as described above to encode the individual behaviors using optional constraints, and using a process as described above to encode the combined behavior above using ordering of optional constraints based on the types of behavior, the distance from the point of action, and specific properties of the model.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC § 112 unless the exact words "means for" are followed by a participle.

What is claimed is:

1. A method for product data management, the method performed by a data processing system and comprising:
   receiving a CAD model in the data processing system, the CAD model including a plurality of features and constraints, including optional constraints;
   receiving a user operation to manipulate a seed feature;
   identifying a plurality of optional constraints corresponding to the user operation, wherein the optional constraints are constraints that are applied to the model only if the optional constraints do not prevent the user operation from occurring;
   sorting the optional constraints into an order in which the optional constraints are to be applied;
   applying a sorted optional constraint that is first in the order in which the optional constraints are to be applied;
   removing the applied sorted optional constraint from the identified optional constraints, and repeating the sorting, applying, and removing processes until all optional constraints have been applied;
   performing the user operation according to the applied constraints to produce a modified CAD model; and
   storing the modified CAD model.

2. The method of claim 1, wherein the sorting is performed according to a behavior class of each identified optional constraint.

3. The method of claim 1, wherein the sorting is performed according to information known about features corresponding to each optional constraint.

4. The method of claim 1, wherein the sorting is performed according to a distance from the seed feature to features corresponding to each of the optional constraints.

5. The method of claim 1, wherein the sorting is performed according to a dependency between optional constraints where a secondary constraint is only applied if a first constraint is applied.

6. The method of claim 1, wherein the user action is performed to produce an accurate and intuitive editing of CAD models according to a combination of at least two of
   a behavior class of each identified optional constraint,
   information known about features corresponding to each optional constraint,
   a distance from the seed feature to features corresponding to each of the optional constraints, and
   a dependency between optional constraints where a secondary constraint is only applied if a first constraint is applied.

7. A data processing system comprising:
   a processor; and
   an accessible memory, the data processing system particularly configured to
   receive a CAD model in the data processing system, the CAD model including a plurality of features and constraints, including optional constraints;
   receive a user operation to manipulate a seed feature;
   identify a plurality of optional constraints corresponding to the user operation, wherein the optional constraints are constraints that are applied to the model only if the optional constraints do not prevent the user operation from occurring;
   sort the optional constraints into an order in which the optional constraints are to be applied;
   apply a sorted optional constraint that is first in the order in which the optional constraints are to be applied;
   remove the applied sorted optional constraint from the identified optional constraints, and repeat the sorting, applying, and removing processes until all optional constraints have been applied;
   perform the user operation according to the applied constraints to produce a modified CAD model; and
   store the modified CAD model.

8. The data processing system of claim 7, wherein the sorting is performed according to a behavior class of each identified optional constraint.

9. The data processing system of claim 7, wherein the sorting is performed according to information known about features corresponding to each optional constraint.

10. The data processing system of claim 7, wherein the sorting is performed according to a distance from the seed feature to features corresponding to each of the optional constraints.

11. The data processing system of claim 7, wherein the sorting is performed according to a dependency between optional constraints where a secondary constraint is only applied if a first constraint is applied.

12. The data processing system of claim 7, wherein the user action is performed to produce an accurate and intuitive editing of CAD models according to a combination of at least two of
    a behavior class of each identified optional constraint,
    information known about features corresponding to each optional constraint,
    a distance from the seed feature to features corresponding to each of the optional constraints, and
    a dependency between optional constraints where a secondary constraint is only applied if a first constraint is applied.

13. A non-transitory computer-readable medium encoded with executable instructions that, when executed, cause one or more data processing systems to:
    receive a CAD model in the data processing system, the CAD model including a plurality of features and constraints, including optional constraints;
    receive a user operation to manipulate a seed feature;
    identify a plurality of optional constraints corresponding to the user operation, wherein the optional constraints are constraints that are applied to the model only if the optional constraints do not prevent the user operation from occurring;
    sort the optional constraints into an order in which the optional constraints are to be applied;
    apply a sorted optional constraint that is first in the order in which the optional constraints are to be applied;
    remove the applied sorted optional constraint from the identified optional constraints, and repeat the sorting, applying, and removing processes until all optional constraints have been applied;
    perform the user operation according to the applied constraints to produce a modified CAD model; and
    store the modified CAD model.

14. The computer-readable medium of claim 13, wherein the sorting is performed according to a behavior class of each identified optional constraint.

15. The computer-readable medium of claim 13, wherein the sorting is performed according to information known about features corresponding to each optional constraint.

16. The computer-readable medium of claim 13, wherein the sorting is performed according to a distance from the seed feature to features corresponding to each of the optional constraints.

17. The computer-readable medium of claim 13, wherein the sorting is performed according to a dependency between optional constraints where a secondary constraint is only applied if a first constraint is applied.

18. The computer-readable medium of claim 13, wherein the user action is performed to produce an accurate and intuitive editing of CAD models according to a combination of at least two of
- a behavior class of each identified optional constraint,
- information known about features corresponding to each optional constraint,
- a distance from the seed feature to features corresponding to each of the optional constraints, and
- a dependency between optional constraints where a secondary constraint is only applied if a first constraint is applied.

\* \* \* \* \*